US012560540B2

(12) United States Patent
Spiecker et al.

(10) Patent No.: US 12,560,540 B2
(45) Date of Patent: Feb. 24, 2026

(54) METHOD FOR SINGLE MOLECULE LOCALIZATION MICROSCOPY

(71) Applicant: LaVision BioTec GmbH, Bielefeld (DE)

(72) Inventors: Heinrich Spiecker, Bielefeld (DE); Stefan Miltenyi, Bergisch Gladbach (DE); Robin Diekmann, Bergisch Gladbach (DE); Ali Kinkhabwala, Bergisch Gladbach (DE); Anthony deVries, Bergisch Gladbach (DE)

( * ) Notice: Subject to any disclaimer, the term of this patent is extended or adjusted under 35 U.S.C. 154(b) by 446 days.

(21) Appl. No.: 18/111,991

(22) Filed: Feb. 21, 2023

(65) Prior Publication Data

US 2023/0296515 A1 Sep. 21, 2023

Related U.S. Application Data

(60) Provisional application No. 63/321,152, filed on Mar. 18, 2022.

(51) Int. Cl.
*G01N 21/64* (2006.01)
(52) U.S. Cl.
CPC ....... *G01N 21/643* (2013.01); *G01N 21/6458* (2013.01); *G01N 2021/6463* (2013.01); *G06T 2207/10056* (2013.01)
(58) Field of Classification Search
CPC .. G02B 21/00; G02B 21/0004; G02B 21/002; G02B 21/0024; G02B 21/0032; G02B 21/0036; G02B 21/004; G02B 21/0052; G02B 21/006; G02B 21/0076; G02B 21/008; G02B 21/0084; G02B 21/06; G02B 21/36; G02B 21/361; G02B 21/365; G02B 21/367; G01N 21/643; G01N 21/6458; G01N 2021/6463; G01N 21/6456; G01N 21/6486; G06T 2207/10056; G06T 2207/10064
USPC ....... 359/385, 362, 363, 368, 369, 388, 389, 359/390, 423, 434
See application file for complete search history.

(56) References Cited

U.S. PATENT DOCUMENTS

| | | | | |
|---|---|---|---|---|
| 2003/0076571 | A1* | 4/2003 | MacAulay | A61B 1/00165 |
| | | | | 359/237 |
| 2016/0316127 | A1* | 10/2016 | Rastegar | G02B 23/243 |
| 2022/0164925 | A1* | 5/2022 | Park | G02B 27/58 |

FOREIGN PATENT DOCUMENTS

| | | | | |
|---|---|---|---|---|
| DE | 10 2008 059 328 | A1 | 2/2010 | |
| WO | WO-2015017730 | A1 * | 2/2015 | G01T 1/185 |

* cited by examiner

*Primary Examiner* — Arnel C Lavarias
(74) *Attorney, Agent, or Firm* — Jaquelin K. Spong

(57) ABSTRACT

Methods for single molecule localization microscopy may use a patterned illumination over the field of view. The patterned illumination may be dynamically adapted to the approximate positions of the detected fluorescent molecule emitters, allowing for increased signal-to-background for their single molecule localization.

8 Claims, 9 Drawing Sheets

| Determine emitter positions | Patterned illumination | Image acquisition |
| --- | --- | --- | time

019

020

021

022    023    024

METHOD FOR SINGLE MOLECULE LOCALIZATION MICROSCOPY

CROSS REFERENCE TO RELATED APPLICATIONS

This non-provisional application claims priority to U.S. Provisional Application Ser. No. 63/321,152, filed Mar. 18, 2022. This prior provisional application is incorporated by reference in its entirety.

STATEMENT REGARDING FEDERALLY SPONSORED RESEARCH

Not applicable.

STATEMENT REGARDING MICROFICHE APPENDIX

Not applicable.

BACKGROUND

The present invention relates to single-molecule localization microscopy (SMLM) for optical super-resolution imaging based on the technique of Point Accumulation In Nanoscale Topography (PAINT).

For PAINT, a solution containing a fluorophore-labeled probe is applied to a biological sample. SMLM with PAINT is then achieved by recording a series of microscopic images of the sample. For a sufficiently low concentration of the free probe, transient binding events of the probe can be detected as isolated, diffraction-limited spots over the background arising from the rapidly diffusing free probe. PAINT is fundamentally limited by the free probe background as well as an additional background generated by probes that transiently bind to highly out-of-focus epitopes.

SUMMARY OF THE INVENTION

The object of this invention is to achieve single molecule localizations using PAINT at substantial depth in conventionally mounted samples with a higher signal-to-background ratio and/or acquisition speed as compared to state-of-the-art widefield or confocal microscopy approaches.

SMLM at depth and for conventionally mounted samples is possible with PAINT using widefield detection, but requires very sparse detection to limit contamination from background light, thereby limiting the speed of acquisition. Significant removal of out-of-focus background light can be obtained by confocal optical sectioning using a spinning disk or a programable array microscope (PAM), allowing for faster acquisition. However, further improvement in the reduction of background or in the enhancement of signal over these approaches would allow for even higher signal-to-background for localization, enabling faster acquisition at depth in conventionally mounted samples for PAINT.

This improvement can be achieved by illuminating the sample with a patterned illumination consisting of a spatially and temporally controlled illumination pattern across the field of view. Continuous monitoring of the field of view allows identification of the approximate positions of emitters to which the patterned illumination can be adapted in a rapid fashion, a method we refer to as 'dynamic masking'. Dynamic masking allows for parallel, enhanced illumination of multiple regions across the focal plane associated with the approximate positions of single fluorescent molecule emitters for more precise and efficient localization of the single emitters for PAINT.

As the patterned illumination requires high spatial resolution over the field of view, the current state-of-the-art solution would correspond to a spatial light modulator (SLM) to generate the patterned illumination.

Additionally, if the SLM is located in both the excitation and emission paths at the conjugate image plane, then confocal sectioning can be achieved as the pixels corresponding to the regions can function as confocal pinholes (akin to a spinning disk confocal), yielding a further increase in the signal-to-background ratio.

Moreover, if the emission light from outside these regions is collected to generate a separate non-conjugate image, then subtraction of the appropriately scaled non-conjugate image from the conjugate image can be used to eliminate out-of-focus background to the noise limit (akin to a PAM), yielding a yet further increase in the signal-to-background ratio.

The regions of enhanced illumination can be further optimized for other localization modalities beyond centroid estimation, e.g. by dynamically sampling the Airy disc of the emitter to generate additional localization information, thereby improving overall precision.

DETAILED DESCRIPTION

Figure 1:
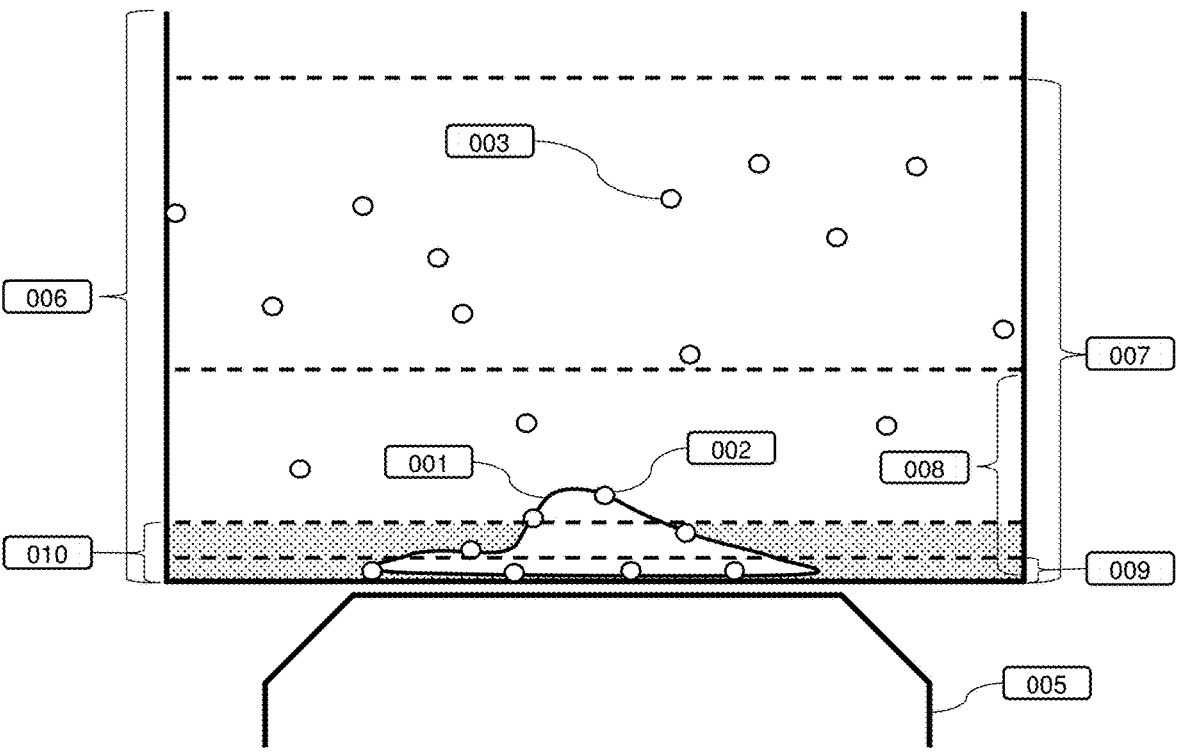
FIG. 1 illustrates the typical setups for SMLM that are based on different amounts of axial sectioning.

Described here is a method for improving signal-to-background for PAINT, which is based on monitoring for the dynamic appearance of fluorescent probes over the field of view coupled with rapid enhanced excitation of the corresponding regions containing the transient probes using a dynamic patterned illumination. Our invention provides at minimum a several-fold improvement in signal-to-background and therefore acquisition speed as compared to conventional widefield or confocal approaches to PAINT.

Within the description of the method, the following terms are used:

SMLM: Single Molecule Localization Microscopy; a form of super-resolution microscopy, where individual fluorescent molecules are imaged in isolation due to being very sparsely distributed, allowing for their localization to very high precision and accuracy. Subsequent imaging of many such molecules over multiple frames allows for the construction of images with higher resolution than possible with conventional optical microscopy. Different forms of SMLM rely on distinct methods to achieve sufficient sparsity/isolation within each frame, while allowing sampling of the whole field of view during the entire acquisition sequence.

PAINT: Point Accumulation In Nanoscale Topography; a form of SMLM where isolation and density of the fluorescent molecule emitters is achieved by the transient chemical binding of the emitters to the sample.

PAM: Programmable Array Microscope; a form of optical sectioning microscopy, where optical sectioning is achieved by projecting patterned light onto the sample with the use of a programmable array, i.e. a spatial light modulator.

TIRF: Total Internal Reflection Microscopy; a form of microscopy where fluorescence is excited exclusively in a non-transmitting evanescent wave region at the boundary layer of the microscope slide, thus restricting any fluorescence to this tiny region.

SLM: Spatial Light Modulator; a device that allows for spatial modulation of the transmission or reflection of incoming light, e.g. the liquid crystal array in an LCD screen.

DMD: Digital Micromirror Device; a spatial light modulator device, where the pixels consist of tiny mirrors that can reflect in two distinct directions.

LCoS: Liquid Crystal on Silicon; a spatial light modulator device, where the pixels can rotate the polarization state of the incoming light in two orientations.

PSF: Point Spread Function; the instrument response function of an imaging system to a point source.

In the drawings the following reference numbers are used to refer to the following features. Similar reference numbers are used in the various figures to refer to components that serve a similar or identical function.

001 Biological sample
002 Fluorescent molecule emitter
003 Freely diffusing fluorescent molecule emitter
004 In-focus fluorescent molecule emitter
005 Objective lens
006 Sample chamber
007 Regular volume sample chamber
008 Small volume sample chamber

009 Sample chamber volume captured by TIRF
010 Sample chamber volume captured by optical sectioning microscopy
011 Light cones
012 Confocal optical section
013 Dynamic masking process
014 Determination of emitter positions
015 Generation of regions
016 Control of illumination
017 Image acquisition
018 Patterned illumination
019 Newly appeared emitter, observed with monitoring illumination
020 Emitter imaged with enhanced illumination
021 Disappeared emitter
022 Approximate position of an emitter
023 Region around the approximate position of an emitter
024 Patterned illumination applied to the field of view
025 Cover glass
026 Main dichroic
027 Tube lens
028 Lens
029 Light source
030 Camera
031 Spatial Light Modulator (e.g. Digital Micromirror Device)
032 Illumination unit
033 Beam combiner
034 Conjugate optical pathway
035 Non-conjugate optical pathway
036 Intermediate image plane
037 Light source for photo-activation
038 Holographic wavefront-shaping SLM
039 Local tilted micro-sheet
040 Back focal plane/entrance pupil
041 Illumination cross-section FIG. 1 displays a typical SMLM setup for PAINT, showing the microscope objective (005), the sample under investigation (001) with transiently bound fluorescent emitters (002) and a sample chamber (006) with buffer volume (007) containing the free fluorescent molecule emitters (003). Strategies for background reduction include reduction of the buffer height (008), and axial restriction of the illumination using Total Internal Reflection Fluorescence (TIRF) microscopy or Light Sheet Microscopy. TIRF microscopy restricts detection to within roughly 100 nm of the coverslip glass (009). While light sheet microscopy allows for detection at depth in the sample and sectioning on the order of half the wavelength of the excitation light (010), it requires non-standard and non-trivial sample mounting with the sample positioned at the focal point of a more complicated optical setup consisting of two orthogonal, closely appositioned objectives.

Homogeneous illumination of the sample allows for recognition of transient fluorescent molecule emitters appearing over the entire field of view. However, homogenous illumination also contributes to background excitation and bleaching, even though there is no information to be gained outside of the regions containing the fluorescent molecule emitters. The novel method described here consists of applying enhanced illumination to illuminate only the regions containing transient in-focus fluorescent molecule emitters, thus preventing unnecessary excitation of out-of-focus fluorescent molecule emitters, consisting of the freely diffusing probes and probes bound to out-of-focus epitopes.

Figure 2:
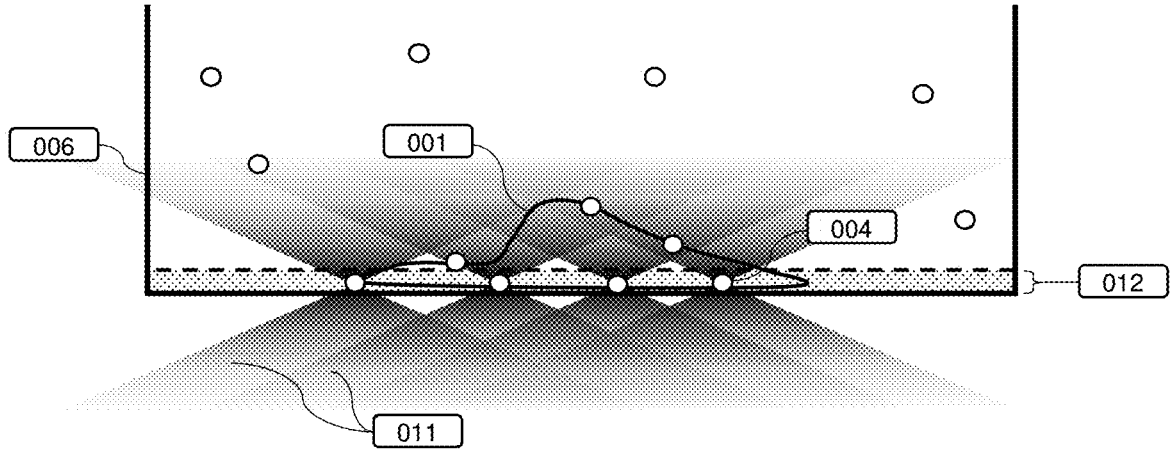
FIG. 2 illustrates the increase of signal-to-background possible with a PAM, which permits axial sectioning, dynamic masking, and reduction of the background to the noise limit via subtraction of the non-conjugate image from the conjugate image.

Enhancement of the signal-to-background ratio for SMLM can be achieved using a microscope apparatus capable of illuminating the sample with spatially and temporally controllable patterned illumination across the field of view. FIG. 2 illustrates the illumination of the sample for the method disclosed here. The spatially controlled patterned illumination is focused upon the set of in-focus emitters (004) that reside within the optical section (012) of the biological sample (001). The resulting patterned illumination consists of a set of cones of light (011) centered on the corresponding emitters. This patterned illumination allows for parallel, enhanced illumination of multiple regions across the focal plane associated with the positions of single fluorescent molecule emitters in an adaptive and highly dynamic fashion. Patterned illumination can be used as the basis for a method introduced here called 'dynamic masking', whereby regions that do not contain in-focus fluorescent molecule emitter are masked out to reduce the overall illumination of the sample and to reduce background. In this way, the sample is illuminated in a highly efficient manner, such that the regions that contain useful information for SMLM are preferentially illuminated. The result is a sequence of images containing individual fluorescent emitters detected at higher signal-to-background for optimal single molecule localization, while also minimizing overall bleaching.

Figure 3:
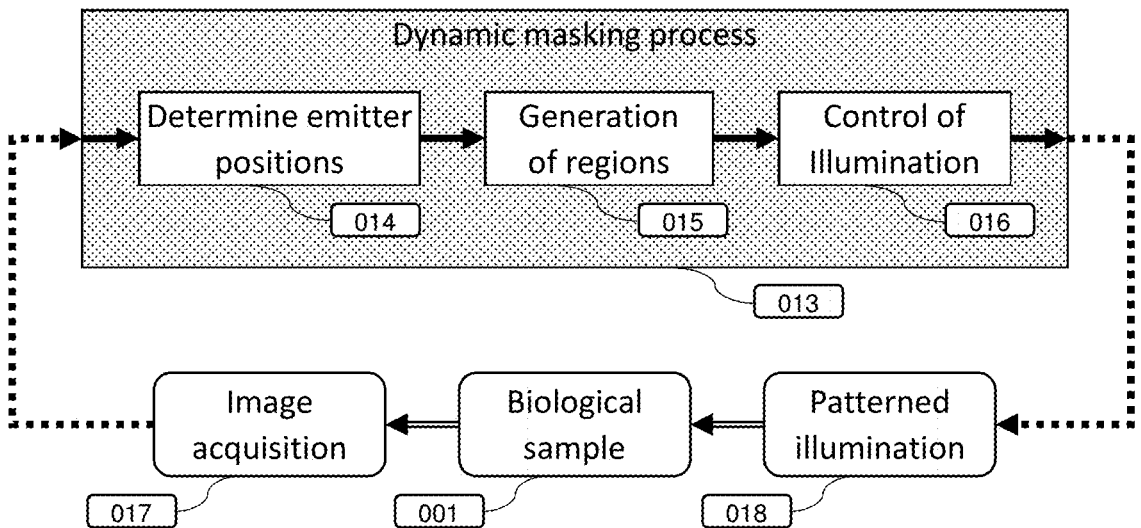
FIG. 3 shows a schematic for the dynamic masking process.

FIG. 3 provides a schematic summary of the dynamic masking method (013). Dynamic masking utilizes continual (or stroboscopic) video-rate monitoring (017) of the illuminated field of view to find the positions (014) of fluorescent molecule emitters followed by on-the-fly image processing to rapidly generate regions around the approximate positions of the emitters (015). The regions are then applied to the spatial and temporal control of the illumination (016) to construct a patterned illumination (018) consisting of regions of enhanced illumination to locally enhance excitation of the transient fluorescent molecule emitters and thereby increase the signal-to-background of their detection for single molecule localization within the biological sample (001). The patterned illumination is updated in a rapid and continuous fashion to account for both the appearance and disappearance of single molecules over the entire field of view.

Figures 4, 5:
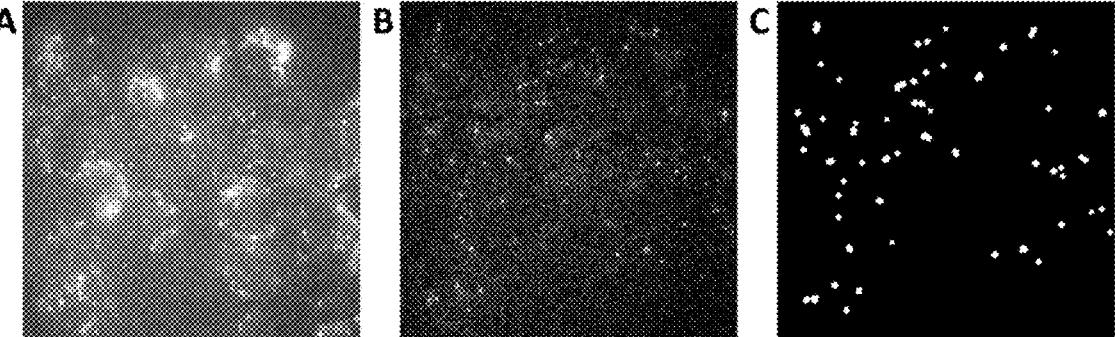
FIG. 4 illustrates the dynamic masking process by showing subsequent acquired images, determination of emitter positions, and the applied illumination patterns that are altered by the appearance and disappearance of the emitters.
FIG. 5 illustrates typical single molecule localization images for widefield and TIRF microscopy, and the construction of regions of enhanced illumination from a given image.

FIG. 4 illustrates the dynamic masking processing steps in detail. At the start of an experiment, the field of view is monitored using a defined level of homogenous illumination. Subsequent images are analyzed to determine the approximate positions (022) of putative fluorescent molecule emitters (019) using state-of-the-art image processing algorithms. Regions (023), of a size determined by the resolution limit of the microscope, are then created in the patterned illumination (024) at the approximate positions of the fluorescent molecule emitters, allowing for their enhanced excitation while minimizing the total illumination of the sample.

As the positions of the molecule emitters are determined for each subsequent acquired image, the appearance of an emitter (019) in the detected image sequence leads to adaptation of the patterned illumination over the field of view (024), adding a new region of enhanced illumination (023) corresponding to the position (022) of that emitter, enhancing fluorescent emission from that emitter (020). On the other hand, the disappearance of a fluorescent molecule emitter (021) leads to removal of the corresponding region of enhanced illumination. The determination of the approximate positions of emitters can utilize more than one image of the image sequence to optimize the response time of the dynamic masking process to account for a variety of effects, including molecule blinking and the signal-to-noise of detection. The patterned illumination determined by the dynamic masking process thus reduces the above-mentioned backgrounds arising from out-of-focus localizations and freely-diffusing fluorescent molecule emitters. Additionally, minimization of sample illumination reduces the overall bleaching rate of the entire pool of fluorescent molecule emitters.

The patterned illumination is dynamically updated to account for the appearance and disappearance of the transient fluorescent molecule emitters, using either a continuous monitoring outside of the approximate positions of the fluorescent molecule emitters, or by means of short monitoring snapshots alternated with enhanced illumination over the regions containing fluorescent molecule emitters.

Monitoring over the field of view and updating of the patterned illumination can be performed dynamically and at a speed suited to the timescale of the fluorescence probe visibility, which can be limited by factors such as transient binding, blinking, and/or photobleaching.

FIG. 5 gives a typical example of an SMLM experiment using PAINT. In panel A, a widefield image of individual CD44fab-Vio667 (Miltenyi Biotec) probes bound to formaldehyde-fixed blood cells is shown (single representative frame from a continuous acquisition). In panel B, a representative frame of the same sample is shown using TIRF microscopy. In panel C, a simple threshold followed by dilation was applied to panel B to create regions across the field of view that contain fluorescent molecule emitters to be localized by SMLM. The area covered by these regions in this typical example corresponds to only 1.8% of the field of view. By restricting the enhanced illumination to these regions in subsequent images, higher signal-to-background imaging can be achieved for single molecule localization.

Embodiment 1

In one embodiment of the invention, dynamic masking is implemented by adding an SLM in the excitation path of a widefield fluorescence microscope.

Figure 6:
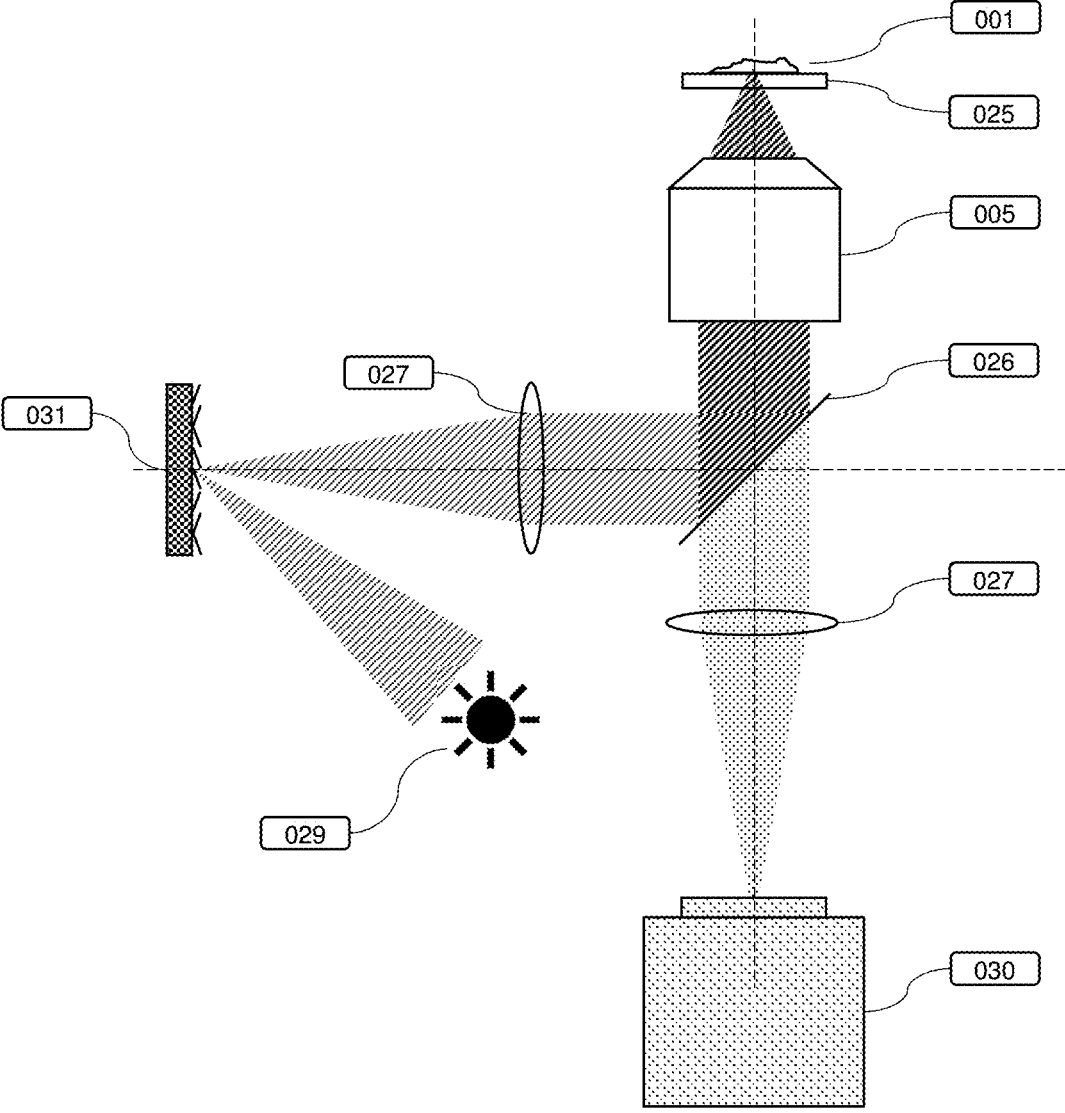
FIG. 6 illustrates an apparatus for dynamic masking based on an SLM (031) in the excitation pathway of a widefield microscope.

FIG. 6 illustrates an example of this embodiment using a Digital Micromirror Device (DMD) as the SLM in the excitation path of the microscope, where one orientation of the micromirrors reflects excitation light onto the sample, and the other orientation discards excitation light into a beam dump. A different SLM such as an LCoS could also be used instead of a DMD, in which case the functionality stays the same but the overall layout of the optical paths is different. For simplicity, we will show examples using a DMD in the figures.

The excitation light source (029) illuminates the DMD (031), which is positioned in the conjugate image plane defined by the microscope objective (005) and tube lens (027). The patterned excitation light from the DMD is coupled into the objective using the main dichroic (026) in a standard epifluorescence layout and projected through the microscope objective (005) onto the biological sample (001) mounted on the coverslip glass (025). The fluorescence light is imaged in the standard widefield emission pathway with a camera (030).

In this embodiment, the DMD is used to establish both the monitoring illumination and the regions of enhanced illumination. The percentage of time that a given DMD pixel is reflecting light to the sample is referred to as its duty cycle. The monitoring of the sample is achieved by running a low duty cycle pattern and the enhanced illumination is achieved by running a high duty cycle pattern over the corresponding pixels of the DMD.

The average area of enhanced illumination is expected to be on the order of 1% of the field of view. Including the excitation that is required for monitoring the field of view for the appearance of new molecules, the following relationship for the amount of background light expected from widefield excitation, $B_W$, vs. dynamic masking, $B_{DM}$, is obtained:

$$\frac{B_W}{B_{DM}} = \frac{1}{f + m * (1 - f)} \approx \frac{1}{f + m}$$

Here, f is the fraction of the area of the field of view over which the enhanced illumination is applied, and m is the relative excitation dose of the monitoring illumination intensity compared to the intensity in enhanced regions. For typical values of f=0.01 and m=0.04, a 20× reduction in background excitation is realized.

Embodiment 2

In one embodiment of the invention, the patterned illumination is created directly by a light source consisting of an array of individual light sources, which can be independently modulated in intensity. Such a light source would obviate the need for an SLM. In the previously described embodiment illustrated in FIG. 6, such an array of light sources would be placed at the position of the DMD (031) in the image plane of the microscope.

Embodiment 3

In an enhanced version of the first embodiment, the SLM is not only located at the conjugate image plane in the excitation pathway, but also in the conjugate image plane in the emission pathway. Such an optical layout creates a confocal imaging device for which the pixels of the SLM function as confocal pinholes, akin to a spinning disk confocal microscope, allowing for rejection of a significant portion of the out-of-focus background fluorescence light from the sample. With the SLM positioned at the conjugate image plane and employing dynamic masking, the signal-to-background ratio of detection is increased over that obtained by a spinning disk $$by \approx \frac{1}{f + m}.$$

Figure 7:
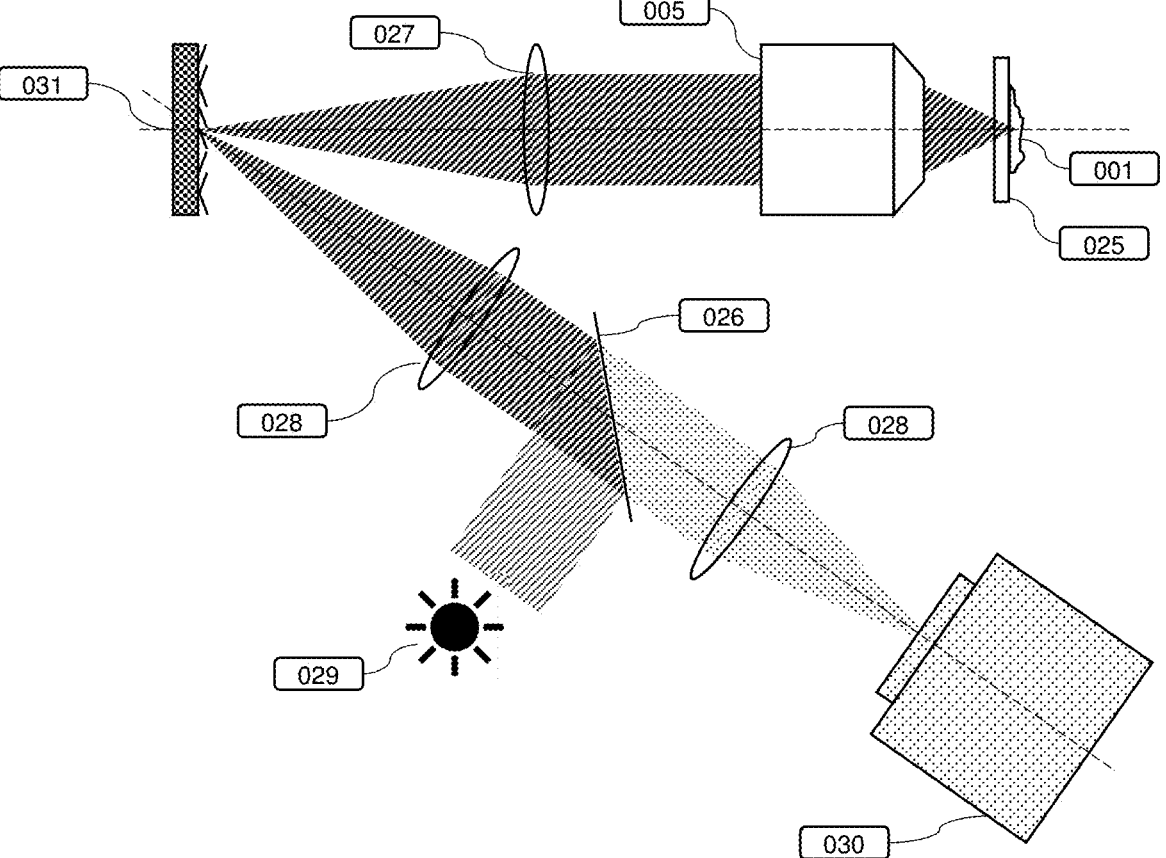
FIG. 7 illustrates an apparatus for dynamic masking for which the SLM (031) is located in both the excitation and detection pathways of a fluorescence microscope, thereby generating a confocal microscope.

FIG. 7 illustrates an example of this embodiment using a DMD as the SLM. Here, the DMD (031) is located in both the excitation and emission paths, with the dichroic mirror (026) that separates the excitation and emission light, placed in between the DMD and the camera (030). The emission light coming from the microscope objective (005) is first imaged onto the DMD using a tube lens (027), and subsequently imaged on the camera using a set of relay lenses (028).

Embodiment 4

In a further enhancement of the previous embodiment, the non-conjugate out-of-focus light is captured by a detector instead of being simply discarded.

Figure 8:
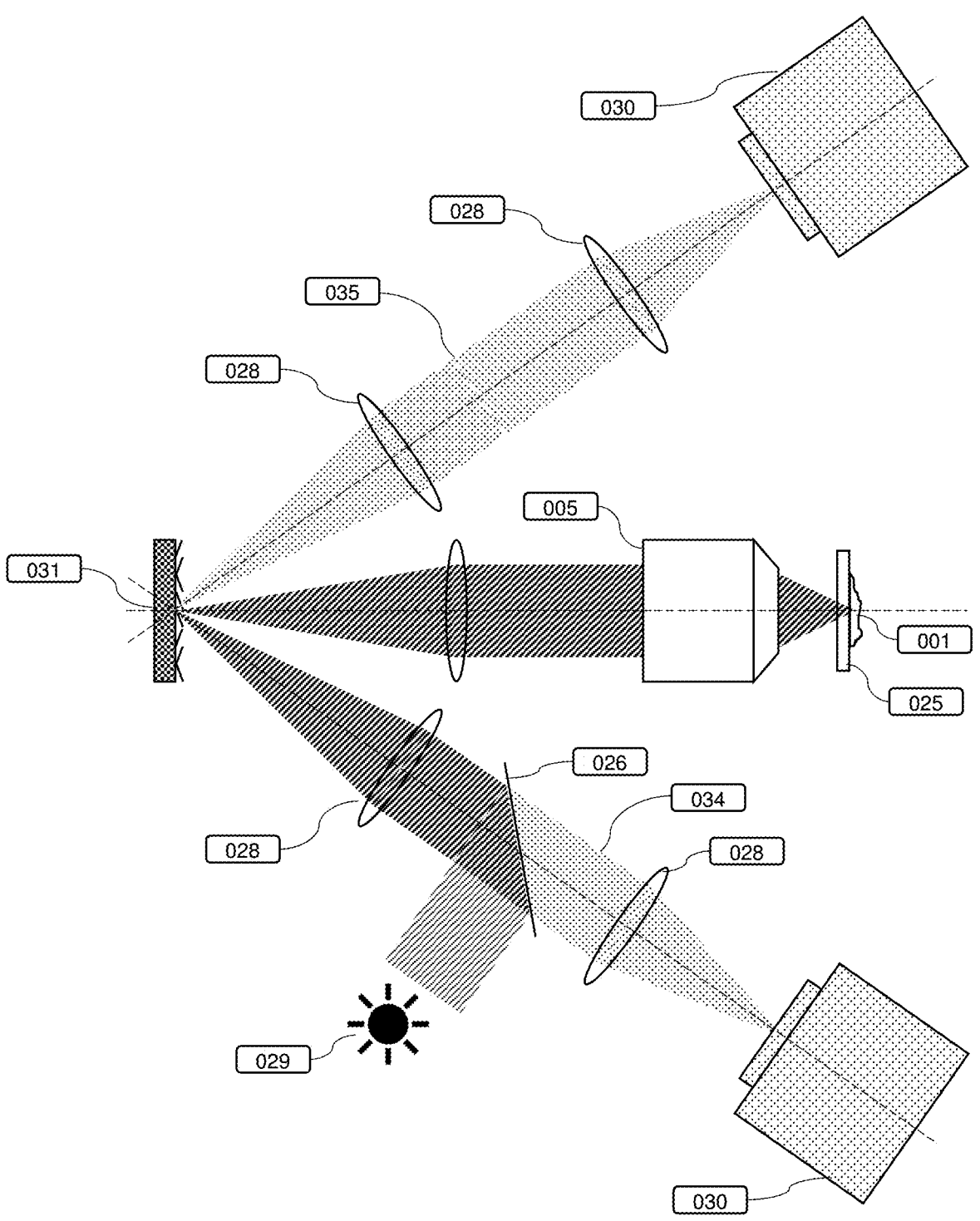
FIG. 8 illustrates an apparatus for dynamic masking for which the SLM (031) is located in both the excitation and detection pathways of a fluorescence microscope, generating a confocal microscope where additionally the out-of-focus light is not simply discarded but instead recorded by a second camera, allowing for even better removal of out-of-focus background from the reconstructed optically sectioned image.

FIG. 8 illustrates an example of this embodiment using a DMD as the SLM. Here, the non-conjugate out-of-focus light reflected by the DMD (031) is imaged by a second camera in an additional non-conjugate pathway (035) with respect to the existing conjugate pathway (034), akin to the optical layout of a PAM.

Parallelized confocal detection across the field of view can lead to considerable crosstalk between the confocal pixels, amounting to an increase of out-of-focus background. This is a limitation common to spinning disk confocal microscopes, especially apparent when imaging thick or densely labeled samples. Detection of the rejected non-conjugate light by a camera yields a spatial image of the out-of-focus background fluorescence, and can function as a measure of the residual background in the conjugate image. A weighted subtraction of the non-conjugate image from the conjugate image allows elimination of the residual background in the optically sectioned image to the noise limit.

When applying the dynamic masking method in a PAM, the pixels of the DMD forming the regions of enhanced illumination should preferably use a 50% duty cycle, to allow for proper subtraction of the out-of-focus background. For maximum intensity, however, one can use a 100% duty cycle for the regions of enhanced illumination. In this case, correct optical sectioning is still assured in the surrounding areas. However, for the regions of enhanced illumination with 100% duty cycle, a direct local measurement of the out-of-focus background is not available from the non-conjugate image, as no light is projected to the non-conjugate detector for these regions. With some additional image processing, a local non-conjugate estimate can still be derived based on the neighboring pixels in the non-conjugate image, allowing subtraction of the approximated contribution of out-of-focus background from the regions of enhanced illumination.

Compared to SMLM acquisition using a conventional PAM setup, employment of the dynamic masking in the PAM will generate a similar reduction of background excitation as in the comparisons above $$of \approx \frac{1}{f + m}.$$

Embodiment 5

In another embodiment, the monitoring illumination is generated at a location different from the SLM, and the SLM is used solely for generating the regions of enhanced illumination.

Figure 9:
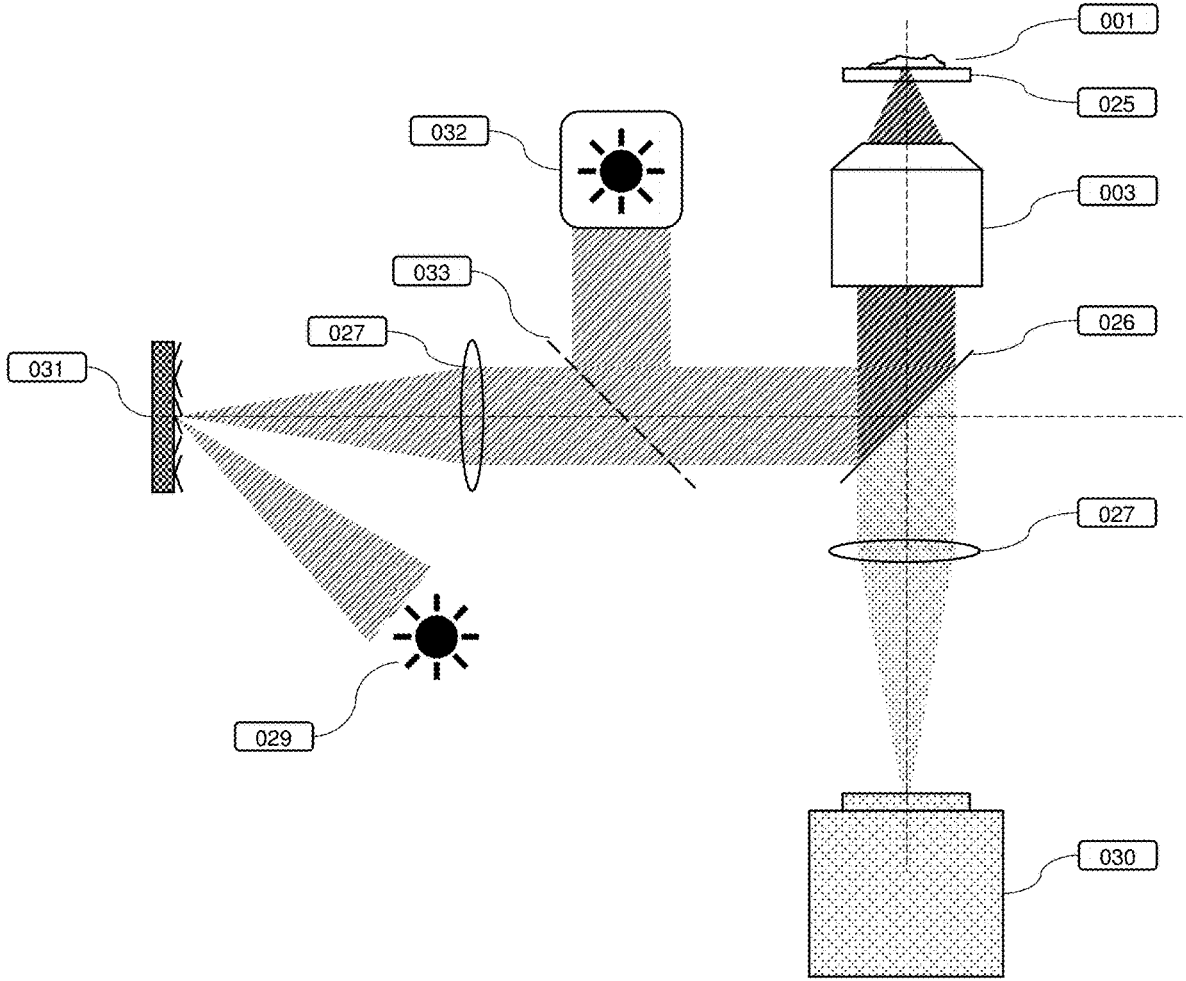
FIG. 9 illustrates an apparatus for dynamic masking for which the enhanced illumination pattern created by an SLM (031) and the monitoring excitation light (032) are generated separately and combined in the excitation path using a beam splitter/combiner (033).

FIG. 9 illustrates an example of this embodiment using a DMD as the SLM. This example is similar to the widefield microscope configuration show in FIG. 6, but with the addition of two further elements (032) and (033). The monitoring illumination (032) is generated at a different location from the DMD (031) and its corresponding light source (029). Both illuminations are then combined in the excitation path of the microscope using a beam combiner (033). This beam combiner can be selected to provide a specific ratio of the monitoring illumination and enhanced illumination from the DMD. Alternatively, the coupled beams could have different polarization, or be spectrally shifted, so as to use polarizing or dichroic beam combiners.

Embodiment 6

In an enhanced version of the previous embodiment shown in FIG. 9, the monitoring (032) is performed using an optical sectioning method, such as spinning disk confocal, slit scanning confocal or structured illumination, whereas the enhanced illumination is generated separately using an SLM and coupled into the excitation path using an appropriate beam combiner.

Embodiment 7

In another embodiment of the invention, optical elements are added to the emission light path between the SLM and detector(s) to gain additional axial information for the individual fluorescent molecule emitters. Such axial information can be generated for example by the addition of a cylindrical lens or a diffractive element to distort the PSF of the particle in a predictable way, yielding information on its location above or below the focal plane. Dynamic masking using enhanced illumination is in principle compatible with the distortions introduced by these methods, as the regions surrounding the particles are large enough that they only increase signal from the individual emitters but should not otherwise significantly alter the distortion itself on which the axial determination is based. Another option would be to use an image splitter element to form multiple images at different focal planes on the detector.

These optical elements could also be combined with the background subtraction capability of embodiment 4. Preferably, the axial information optical elements are included in both the conjugate and non-conjugate light paths to generate an equivalent distortion in the out-of-focus light in the non-conjugate image as in the conjugate image. The positioning of the axial information optical element in front of the non-conjugate detector need not be highly precise, as the non-conjugate image records only the out-of-focus light, and the exact distortion of the out-of-focus light by a slightly misaligned axial information optical element should not be critical.

Embodiment 8

In another embodiment of the invention, the regions of enhanced illumination within the patterned illumination are optimized for other SMLM localization modalities beyond centroid estimation by dynamic sub-sampling of the individual PSFs of the fluorescent molecule emitters by adjusting the size, shape, and position of each corresponding region of enhanced illumination.

For example, by small displacement of the center of the illumination region with respect to the center of the fluorescent molecule, it is possible to dynamically sample the PSF of the molecule. This generates additional localization information in the form of a triangulation based on the relative intensities of the different illumination positions. The displacements need to be chosen such that the increase of triangulation information is larger than the reduction in signal, thus ensuring an improvement in localization precision.

In a similar manner, a triangulation in three dimensions (3D) can be performed, by adding a small displacement in depth, either by a displacement of the focus in the sample, or by using an SLM forming a digital hologram, where the individual focus spot can be varied in depth. Such 3D triangulation would furthermore allow extraction of the axial position of the emitter.

Embodiment 9

In most of the previously described embodiments the SLM could also be a holographic phase-based SLM. This approach has the potential to more efficiently use the excitation light and to thereby deliver higher intensity to the regions of enhanced illumination.

Figure 10:
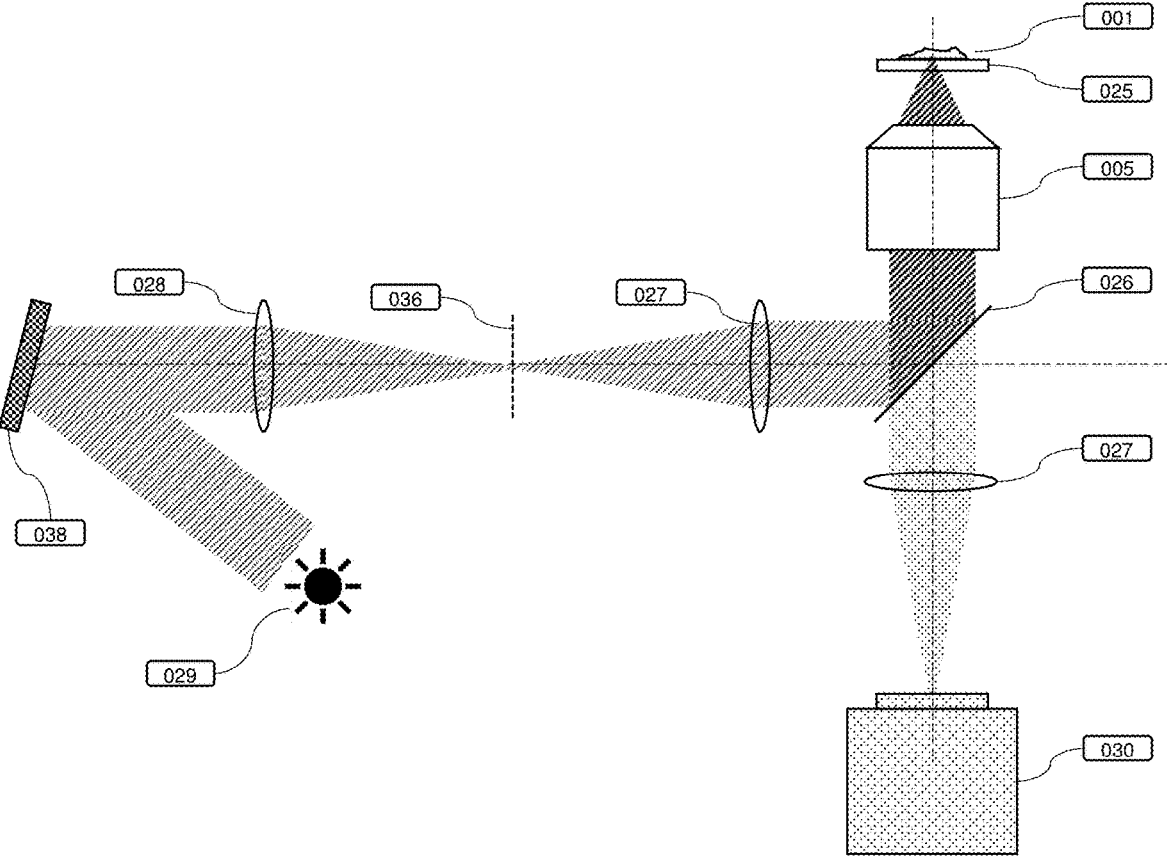
FIG. 10 illustrates an apparatus for dynamic masking for which a holographic SLM is employed.

FIG. 10 illustrates an example for this embodiment where the excitation light (029) is modulated by a holographic SLM (038) located approximately in a plane conjugate to the back focal plane of the objective.

A phase mask introduced by the SLM generates an illumination pattern in the image plane or a plane conjugated to the image plane (036), which can be calculated using a Fourier transformation or other algorithm. It could also make sense to remove the SLM from the conjugate plane to make sure that the zero-order light is not focused in the focal plane. Alternatively, the SLM could be illuminated with divergent light to remove the zero order light from the focal plane. One could also imagine that the zero-order light is used as the monitoring light to illuminate the full field, whereas the first order light is used as the patterned illumination for the molecules to be localized. The advantage of an SLM at the conjugate of the back focal plane of the objective is that the power of the light can be concentrated down to the positions of the molecules to be analyzed. Thus, the total intensity needed to illuminate the SLM could be orders of magnitude lower with respect to the case where the full field of interest is illuminated and only individual positions are switched on.

Embodiment 10

In another embodiment of the invention the molecules are illuminated with tilted cones of light.

Figure 11:
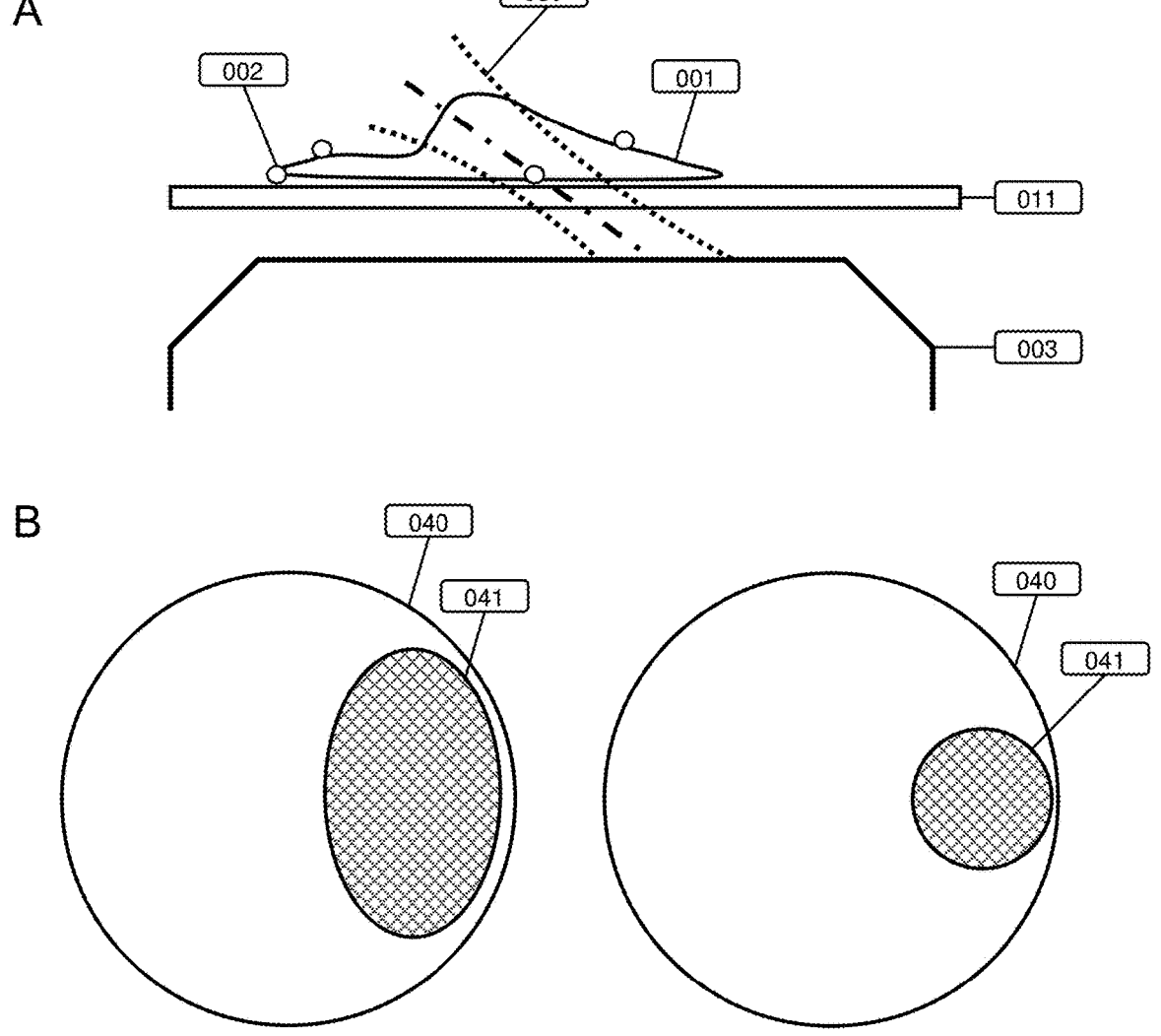
FIG. 11 illustrates the local tilted micro-sheet concept. (A) Tilted light cone out of the objective. (B) Acentric illumination of the back focal plane of the objective.

FIG. 11 illustrates the tilted cones of light onto the sample (panel A), as well as the required illumination areas at the back focal plane of the objective (panel B). This can be realized in various manners. As one example, the area illuminated on the SLM is imaged not to the center of the back focal plane (040) but acentric (041). The resulting patterned illumination is then comprised of light beams that are tilted with respect to the object plane. The tilt angle can be between 30 and almost 90 degrees to the object plane normal. The targeted fluorescent molecule emitter is thus illuminated by a tilted cone of light (039) in the focal plane. This already gives a local sectioning and reduction of background intensity. Fluorescent molecule emitters which are not in the object plane are only excited if they are laterally displaced from the focus along the tilt direction and thus can be recognized.

We describe a method for using a light microscope having an objective lens (005) with a resolution limit to form a sequence of images of a biological sample for the purpose of single molecule localization microscopy. This method may include exciting emitters (002) in parallel in a field of view of the objective lens with excitation light from an at least one first light source (029), and subsequent detection of the light emitted from the emitters in parallel as a result of the excitation light with an at least one first detector (030) to acquire an image. Approximate positions (022) of the emitters may then be determined based on the acquired images. Regions corresponding to the approximate positions of the emitters may be generated, wherein each region (023) is localized at each emitter in the subset and has characteristic dimensions comparable to the resolution limit of the microscope. A first patterned illumination (024) from at least one light source based on the regions may be adapted that illuminates a plurality of emitters in parallel in subsequent images. Repetition of the aforementioned steps in a continuous fashion constitutes a 'dynamic masking' process (013), where the patterned illumination may be updated to account for the appearance and disappearance of the individual emitters in the field of view in the acquired images.

This method may further include creating patterned illumination consisting of enhanced illumination within the regions corresponding to the approximate positions of the emitters, where the regions of enhanced illumination may receive more excitation light than the remaining portions of the field of view, and wherein the regions may be disposed so as to illuminate a plurality of emitters in parallel.

For the above methods, an array of individual light sources may be used for the first light source, for which the patterned illumination could be created by altering the intensity of the individual light sources.

This method may also include modulation of the light from the first light source through use of a spatial light modulator (SLM, 031) to establish the patterned illumination.

This method may also include imaging the emitted light from the emitters onto the SLM, and then detecting the subsequent modulated emitted light using the first detector. In this way, modulation of the detected light from the emitters by the same subset of pixels of the SLM that modulate the light from the first light source onto the sample would allow for a confocal detection of the emitters through rejection of out-of-focus light by the remaining pixels of the SLM from the detected image.

The methods above employing confocal detection may further include detection of the rejected out-of-focus light by the SLM by imaging that light onto at least one of an unused area of a surface of the first detector and a second detector. This method may further include removal of the residual out-of-focus light from a confocal image by scaled subtraction of the detected out-of-focus light.

The above methods may also include sampling of the point-spread function (PSF) of each emitter in parallel by at least one of temporal and spatial modulation of the patterned illumination over the emitter.

The method may also include the creation of tilted cones of light (039) onto each of the emitters with respect to the optical axis by illuminating the back focal plane (040) of the objective lens of the microscope acentric (041).

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. Accordingly, the exemplary implementations set forth above are intended to be illustrative, not limiting.

What is claimed is:

1. A method for using a light microscope having an objective lens (005) with a resolution limit to form a sequence of images of a biological sample for single molecule localization microscopy, comprising the steps:
   a) exciting emitters (002) in parallel in a field of view of the objective lens with excitation light from an at least one first light source (029);
   b) detecting light emitted from the emitters in parallel as a result of the excitation light, with an at least one first detector (030) to acquire an image;

c) determining approximate positions (022) of the emitters based on the acquired images;
   d) generating regions corresponding to the approximate positions of the emitters, wherein each region (023) is localized at each emitter in a subset, wherein each region has characteristic dimensions comparable to the resolution limit of the microscope;
   e) adapting a first patterned illumination (024) from at least one light source based on the regions, illuminating a plurality of emitters in parallel in subsequent images; and
   and f) repeating steps a)-e) to constitute a 'dynamic masking' process (013) in a continuous fashion, updating the patterned illumination based on an appearance and disappearance of the individual emitters in the field of view in the acquired images.

2. The method of claim 1, further comprising:
creating patterned illumination consisting of enhanced illumination within the regions corresponding to the approximate positions of the emitters, where the regions of enhanced illumination receive more excitation light than other portions of the field of view, and wherein the regions are disposed so as to illuminate a plurality of emitters in parallel.

3. The method of claim 1, further comprising:
using an array of individual light sources for the first light source; and
creating patterned illumination by altering an intensity of the individual light sources.

4. The method of claim 1, further comprising:
modulating the light from the first light source using a spatial light modulator (SLM, 031), establishing the patterned illumination.

5. The method of claim 4, further comprising:
imaging the emitted light from the emitters onto the SLM, and then detecting the subsequent modulated emitted light using the first detector with a first set of pixels; and thereby
modulating the detected light from the emitters by the first set of pixels of the SLM that modulate the light from the first light source onto the sample, allowing for a confocal detection of the emitters through rejection of out-of-focus light by a second set of pixels of the SLM from the detected image.

6. The method of claim 5, further comprising:
detecting the rejected out-of-focus light by the SLM by imaging that light onto at least one of an unused area of a surface of the first detector and a second detector, removing residual out-of-focus light from a confocal image by scaled subtraction of the detected out-of-focus light.

7. The method of claim 2, further comprising:
sampling a point-spread function of each emitter in parallel by at least one of temporally and spatially modulating of the patterned illumination over the emitter.

8. The method of claim 3, further comprising:
creating tilted cones of light (039) onto each of the emitters with respect to an optical axis by illuminating a back focal plane (040) of the objective lens of a microscope acentric (041).

* * * * *